3,201,381
EMULSIFIABLE POLYETHYLENE WAXES AND PROCESS OF PREPARATION
Hugh J. Hagemeyer, Jr., and Raymond L. Etter, Jr., Longview, Tex., assignors to Eastman Kodak Company, Rochester, N.Y., a corporation of New Jersey
No Drawing. Filed June 20, 1962, Ser. No. 203,700
13 Claims. (Cl. 260—94.9)

This invention relates to novel emulsifiable polyethylene waxes and their process of preparation. More particularly, this invention relates to novel, melt stable, emulsifiable polyethylene waxes which form only a minimum of "grit" (solid particles) in an emulsion. In a specific aspect, this invention relates to novel emulsifiable polyethylene waxes that are prepared in the presence of an aliphatic monocarboxylic acid, as hereinafter described.

In recent years, water emulsifiable, self-polishing polyethylene waxes have become available commercially. These polyethylene waxes are specifically designed for use as water-emulsion polishes, textile finishes, paper coatings and the like, have molecular weights in the range of about 250 to about 6,000 and are characterized by their ability to form tough, flexible and highly water resistant coatings. These emulsifiable polyethylene waxes can be conveniently prepared by the controlled oxidation of nonemulsifiable polyethylene waxes having molecular weights in the range of about 250 to about 6,000 to form substantially noncrosslinked, completely emulsifiable waxes having molecular weights and softening points which are not substantially different from the nonemulsifiable starting material. Due to their excellent properties, commercial availablity, constant quality and inexpensive character, the emulsifiable polyethylene waxes are excellent substitutes for naturally occurring waxes such as carnauba wax, for example, which are available in limited quantities and then only at relatively high cost. However, emulsifiable polyethylene waxes now available are somewhat deficient as wholy desirable emulsifiable waxes due to instability towards changes in viscosity and emulsifiability, as well as the formation of solid particles in water emulsions containing them. Such solid particles are known as 'grit" and their presence in an emulsion severely restricts the use of the emulsifiable polyethylene waxes in applications where high quality wax emulsions are needed. It is evident, therefore, that the art will be greatly enhanced by emulsifiable polyethylene waxes exhibiting improved stability against changes in viscosity and emulsifiability and decreased "grit" formation. Likewise, a valuable contribution to the art will be a process for the preparation of such materials.

Accordingly, it is an object of this invention to provide novel, melt stable, emulsifiable polyethylene waxes.

Another object of this invention is to provide novel emulsifiable polyethylene waxes exhibiting improved stability against changes in viscosity and emulsifiability and decreased "grit" formation and a process for the preparation of such products.

Another object of this invention is to provide a process for the preparation of emulsifiable polyethylene waxes exhibiting the aforementioned improved combination of properties using relatively inexpensive and commercially available materials.

Another object of this invention is to provide novel emulsifiable polyethylene waxes exhibiting improved melt stability while still exhibiting the good physical properties characteristic of emulsifiable polyethylene waxes such as good hardness, color and toughness.

Another object of this invention is to provide novel polyethylene waxes that are 100% emulsifiable in water and form extremely stable and clear emulsions which are substantially free of "grit."

Another object of this invention is to provide emulsifiable polyethylene waxes that are stable against changes in viscosity and emulsifiability even after being held in the molten state for several days.

Still another object of this invention is to provide a process for preparing an improved emulsifiable polyethylene wax in the presence of one or more aliphatic monocarboxylic acids.

Other objects will become apparent from an examination of the specification and claims which follow.

In accordance with this invention, it has been found that a novel, melt stable, emulsifiable polyethylene wax exhibiting decreased "grit" formation can be formed, without adversely affecting the other desirable physical properties characteristic of this type of wax, by oxidizing a nonemulsifiable polyethylene wax with an oxygen-containing gas at a temperature in the range of about 130 to 160° C., a pressure in the range of about 0 to about 1,000 p.s.i.g. and in the presence of an aliphatic monocarboxylic acid containing 2–20 carbon atoms to form an emulsifiable wax having an acid number in the range of about 4 to about 25.

A significant feature of this invention is the fact that the aliphatic monocarboxylic acid employed in forming the novel emulsifiable wax must be present during the oxidation of the nonemulsifiable polyethylene wax. Thus, the addition of the acid to the polyethylene wax after the oxidation step results in a reduction of the acid number of the product and a loss of emulsifiability, as shown by Example 3 which follows.

Another significant feature of this invention is the fact that the aliphatic monocarboxylic acids employed in the practice of this invention are selective in their action. Thus, the substitution of other acids, e.g. polycarboxylic acids containing the same number of carbon atoms, for the monocarboxylic acid results in a product exhibiting a markedly decreased melt stability, as shown by Example 5.

Any of the polyethylene waxes that are nonemulsifiable in water can be employed in the practice of this invention. Nonemulsifiable polyethylene waxes which are particularly suited for use in the practice of this invention are the hydrocarbon waxes that are prepared by the polymerization of ethylene to form a polymer having a molecular weight in the wax range or by thermally degrading a plastic-grade polyethylene, for example, polyethylene having a molecular weight in the range of about 10,000 to about 30,000, to a molecular weight in the wax range. However, polyethylene waxes which are in the form of "telomers" can also be employed with good results in the practice of this invention. These waxes are essentially hydrocarbon, although they do contain a terminal residue on the polyethylene chain resulting from the polymerization of ethylene in the presence of a coreactant.

The nonemulsifiable polyethylene waxes prepared by thermally degrading plastic-grade polyethylene having an average molecular weight of from 10,000 to about 30,000 are particularly suited for use in this invention. Chain branching in the plastic-grade polyethylene normally occurs every 50–70 carbon atoms. Thermal degradation generally takes place at these points of chain branching and is initiated by heat, light or oxygen residues in the polyethylene. The degree of degradation is controlled by reaction time and temperature to give hard, white waxes having average molecular weights from 250 to 6,000 and softening points in the range of about 88 to about 125° C. By carefully controlling the time, temperature and agitation, a thermally degraded polyethylene of relatively narrow molecular weight range is obtained. The temperature employed in such a degradation process is subject to wide variation although temperatures in the range of about 350 to about 420° C. generally give satisfactory results. The hard, white wax-like thermal degradation products are not emulsifiable as such but, upon subjecting them in a molten state to a stream of finely divided air or other oxygen-containing gas, oxidation occurs, thereby increasing the acid number and saponification number of the waxes until they are completely emulsifiable.

As already indicated, suitable nonemulsifiable polyethylene waxes that can be used in the practice of this invention are prepared by subjecting ethylene, in the presence or absence of a suitable coreactant, to temperatures and pressures suitable for the preparation of polymers having molecular weights within the wax range. When a coreactant is used, it may be, for example, a normally liquid organic compound free of olefinic unsaturation, for example, an alcohol such as isopropanol, an ester such as methyl propionate, a ketone such as acetone, an ether, an alkane, an alkyl benzene or the like. Nonemulsifiable polyethylene waxes prepared by the polymerization of ethylene in the presence of a coreactant to form a "telomer" having a structure which is essentially polymeric and containing as a terminal addition to its polyethylene chain a radical of the coreactant are described in U.S. Patents 2,683,141 and 2,504,400, for example.

In general, and regardless of their process of preparation, the nonemulsifiable polyethylene waxes employed in the practice of this invention are characterized by molecular weights in the range of about 250 to about 6,000, preferably in the range of about 1,000 to about 4,500, ring and ball softening points (ASTM D36-26) in the range of about 88° to about 125° C., desirably in the range of about 90° to about 112° C. and most preferably in the range of about 104° to about 111° C., an acid number of substantially 0 and a density in the range of about 0.90 to about 0.97, the most preferred waxes having a density in the range of about 0.938 to about 0.956 (ASTM D1505-57-T).

The Staudinger system of determining molecular weights is intended when reference is made to molecular weights herein. More particularly, the molecular weights of the polymers are calculated from inherent viscosity of a dilute solution of a polyethylene. The viscosity of a dilute solution of a polyethylene has been shown to be related to the known average molecular weight $[M_N]$ according to the following formula:

$$(\eta) = 2.21 \times 10^{-3}([M_N])0.60$$

The inherent viscosity $(\eta)$ is determined using a 0.25% tetralin solution of th epolymer at 100° C.

$$(\eta) = \frac{\ln \eta_r}{C}$$

wherein $\eta_r =$ $$\frac{\text{Flow time of solution}}{\text{Flow time of solvent}}$$

The concentration in grams per 100 ml. is denoted by C.

In practicing this invention, any one or a mixture of the aliphatic monocarboxylic acids containing 2–20 carbon atoms are effective. These aliphatic monocarboxylic acids are those containing only carbon, hydrogen and oxygen and are straight or branched chain, saturated or unsaturated. Particularly effective aliphatic monocarboxylic acids are represented by the formula:

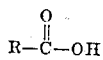

where R is an alkyl radical containing 2–19 carbon atoms, as exemplified by stearic acid. Although any of the aliphatic monocarboxylic acids containing 2–20 carbon atoms, and preferably those containing 12–18 carbon atoms, can be employed in the practice of this invention, a prime consideration in choosing the particular acid is the intended use of the emulsifiable polyethylene wax. Thus, during the oxidation of the nonemulsifiable polyethylene wax the monocarboxylic acid is present and chemically combines with the wax resulting in an emulsifiable polyethylene wax exhibiting improved properties.

However, in the case of the lower molecular weight monocarboxylic acids, e.g. those containing 2–8 carbon atoms, as exemplified by acetic and butyric acids, small amounts of excess acid may result in a product having some slight odor. Such small amounts of excess acid can be removed by sweeping the polymer with a gas above the boiling point of the acid. In the case of the higher molecular weight acids such as stearic acid, however, any excess acid need not be removed from the product since it does not impart any odor and in some cases, enhances the emulsifiability of the product. The aliphatic monocarboxylic acids which are suitable for use in the practice of this invention include, for example, acetic, propionic, butyric, isobutyric, valeric, caprylic, nonanoic, lauric, stearic, nonadecanoic, acrylic, butenoic, sorbic, palmitic, oleic and the like.

In general, the presence of less than 1%, by weight e.g. as little as .1%, by weight, of the aliphatic monocarboxylic acid in the nonemulsifiable polyethylene wax during its oxidation, will result in a melt stable emulsifiable wax exhibiting decreased "grit" formation. However, where a particularly high degree of stability is required, or the particular acid employed has a higher molecular weight, it has been found desirable to use percentages of acid of at least 6%. It is most desirable to use wax percentages in the range of about 3 to about 6%, although percentages up to and including 10% give good results. More than 10% by weight of the acid can be employed during the oxidation procedure, but no particular advantages are derived therefrom.

As already indicated, the polyethylene waxes prepared by direct synthesis from ethylene, in the presence or absence of coreactant, or by thermal degradation have acid numbers of substantially 0 and are not emulsifiable. However, upon subjecting these waxes, in a molten state, to a stream of finely divided air or other oxygen-containing gas, oxidation occurs, thereby increasing their acid numbers to within the range of about 4 to about 25, and most preferably, in the range of about 8 to about 16, without any substantial increase in molecular weight and softening point. The inclusion of an aliphatic monocarboxylic acid, as herein defined, during this oxidation procedure results in an emulsifiable wax exhibiting enhanced properties. The oxidation reaction can be initiated in the presence or absence of catalysts such as organic peroxides, as exemplified by ditertiary butyl peroxide, or in the presence or absence of a stabilizing agent such as sodium or potassium carbonate. The use of a peroxygen compound to initiate the oxidation eliminates the induction period usually experienced in this type of oxidation but has no effect on the final acid number of the emulsifiable wax obtained. The presence of a stabilizing agent gives a faster and smoother reaction by stabilizing the oxidation intermediates and results in a product that is slightly harder than one obtained in its absence.

Temperature is a significant factor in controlling the oxidation of the nonemulsifiable polyethylene wax as well as the properties exhibited by the resulting emulsifiable wax. Although temperatures varying from 100 to 250° C. can be employed in oxidizing polyethylene and thermally degraded polyethylene with air and/or oxygen-containing gas, the temperature range in which a noncrosslinked oxidized wax of relatively low viscosity and high hardness can be obtained is in the narrow range of 100 to 160° C., preferably 130 to about 160° C., and at pressures from atmospheric to about 1,000 p.s.i.g., preferably in the range of about atmospheric to about 300 p.s.i.g. At temperatures below the aforementioned range the oxidation proceeds only slowly or not at all and, at higher temperatures, crosslinking and increased viscosities are observed. The oxidation is accomplished using any of the conventional equipment ordinarily available for this purpose, for example, oxidation can be accomplished in either an agitated pot or agitated vessel permitting continuous operation.

The emulsifiability of a polyethylene wax can be conveniently evaluated by the procedure described hereinbelow. This procedure is used to evaluate the emulsifiability of the polyethylene waxes in the following examples.

Add 40 g. of emulsifiable polyethylene wax and 8 ml. of oleic acid to a porcelain casserole. Melt the blend on a hot plate while maintaining a temperature of 120–215° C. Add 7 ml. of 2-amino-2-methyl-1-propanol (or morpholine) slowly to the stirred mixture. Stir the melt for three minutes and then pour it into 200 ml. of hot water (99° C.) which is agitated by means of a mechanical stirrer. The wax is poured into the top of the vortex in such a manner that it does not touch the agitator or the container walls. The agitation is continued until the emulsion has cooled to below 50° C. The emulsion is rated as follows:

Good, pass—Clear or translucent, stable
Borderline—Slightly milky, stable
Fail—Milky, stable "Grit" is evidenced by solid particles in an emulsion and can be conveniently evaluated by coating a smooth black card or glass with the emulsion and visually observing its appearance. The rating of 1–10 is given, with 1 being the complete absence of any solid particles, and 10 being the presence of a large amount of solid particles resembling rough sandpaper.

This invention can be further illustrated by the following examples of preferred embodiments thereof although it will be understood that these examples are included merely for purposes of illustration and are not intended to limit the scope of the invention unless otherwise specifically indicated.

*Example 1*

194 g. of a nonemulsifiable polyethylene wax prepared by thermal degradation and having an average molecular weight of about 1,000, a Brookfield viscosity (125° C.) of 1,000 cps., an acid number of substantially 0, color (Gardner scale) of 1 and a softening point of 108° C. is added to a 500 ml. round bottom flask. 6 g. of stearic acid is added and the mixture is oxidized at 150° C. with oxygen for 4 hours to an acid number of 15.8. The resulting emulsifiable polyethylene wax has a softening point of 107° C., an acid number of 13 to 15, color (Gardner scale) of 1–2 and a molecular weight of about 1200.

As already indicated, the emulsifiable polyethylene waxes prepared according to the process of this invention possess a high degree of thermal and emulsion stability. To illustrate, a sample of the above wax is placed in a 32 x 200 ml. test tube in a 125° C. constant temperature bath and the increase in viscosity of the sample is determined using a Brookfield Viscometer. The results, compared with a control sample prepared in the absence of the acid, are as follows:

| Polymer | Viscosity at 125° C. After Heating at 125° C. for— | | | | Emulsion at end of 3d day |
|---|---|---|---|---|---|
| | 0 day | 1 day | 2 days | 3 days | |
| Control | 1,200 | 5,400 | Set up 1,800 | | Fail. |
| Acid treated | 1,200 | 1,600 | | 2,200 | Good. |

As can be seen from the above data, even after three days, the viscosity of the sample prepared in accordance with this invention has not increased to the point where the wax sets up as it has for a sample of this same wax prepared in the absence of the aliphatic monocarboxylic acid. In addition, the control sample has a grit rating of 8 while the stearic acid modified sample has a rating of 1–2.

*Example 2*

The procedure of Example 1 is repeated using a nonemulsifiable polyethylene wax having a molecular weight of 600, a Brookfield viscosity (125° C.) of 300 cps., an acid number of substantially 0, color (Gardner scale) of 1 and a softening point of 106° C. There is obtained an emulsifiable polyethylene wax having a molecular weight of 620, a softening point of 105° C. and an acid number of 15.5.

To illustrate the thermal and emulsion stability of this emulsifiable polyethylene wax, the procedure of Example 1 is repeated and the results are as follows:

| Polymer | Viscosity at 125° C. After Heating at 125° C. for— | | | | Emulsion at end of 3d day |
|---|---|---|---|---|---|
| | 0 days | 1 day | 2 days | 3 days | |
| Control | 390 | 450 | 600 | 900 | Fail. |
| Acid treated | 380 | 400 | 420 | 460 | Good. |

As already indicated, the aliphatic monocarboxylic acid employed in the practice of this invention can also be unsaturated. Thus, when unsaturated acids such as oleic are substituted in the above procedure similar results are achieved.

*Example 3*

As already pointed out in the specification, an important feature of this invention is the presence of the monocarboxylic acid during the oxidation of the nonemulsifiable polyethylene wax. Thus, an emulsifiable wax is prepared by oxidizing 194 g. of a nonemulsifiable polyethylene wax having a molecular weight of 2,000, a Brookfield viscosity (125° C.) of 1200 cps. and a softening point of 105° C. with oxygen at 150° C. for 4 hours. The emulsifiable polyethylene wax has an acid number of 15. To this emulsifiable polyethylene wax is added 6 g. of stearic acid. The mixture is heated to 150° C. and stirred for 4 hours. At the end of this time the wax, although it has an acid number of 23, will not emulsify.

*Example 4*

Example 1 is repeated using 3%, by weight, of acetic acid in place of the stearic acid. The resulting emulsifiable polyethylene wax exhibits no significant differences in physical properties from those of the product prepared in the presence of stearic acid. The results of thermal and emulsion stability tests are as follows:

| Polymer | Viscosity at 125° C. After Heating at 125° C. for— | | | | Emulsion at end of 3d day |
|---|---|---|---|---|---|
| | 0 days | 1 day | 2 days | 3 days | |
| Control | 1,200 | 5,600 | Set up | | Fail. |
| Acid treated | 1,350 | 1,800 | 2,100 | 2,900 | Pass. |

*Example 5*

The procedure of Example 1 is repeated using 1%, by weight, of isobutyric acid in place of the stearic acid. The emulsifiable polyethylene wax which results exhibits properties which are not substantially different from those of the emulsifiable polyethylene wax prepared in Example 1. The results of the thermal and emulsion stability tests are as follows:

| Polymer | Viscosity at 125° C. After Heating at 125° C. for— | | | | Emulsion at end of 3d day |
|---|---|---|---|---|---|
| | 0 days | 1 day | 2 days | 3 days | |
| Control | 1,200 | 5,650 | Set up | | Fail. |
| Acid treated | 1,320 | 1,860 | 2,200 | 2,850 | Pass. |

As previously indicated, the aliphatic monocarboxylic acids are specific in their ability to improve the thermal and emulsion stability of emulsifiable polyethylene waxes. Thus, polycarboxylic acids of corresponding carbon content will not effect the desired results. To illustrate, the above procedure is repeated, adding 3%, by weight, of maleic anhydride to a 200 ml. flask containing the nonemulsifiable polyethylene wax. The mixture is melted, stirred and oxidized with oxygen at 150° C. After a period of only 1½ hours' oxidation time, the material sets up to a stringy viscous mass which cannot be emulsified.

*Example 6*

A nonemulsifiable polyethylene wax having a molecular weight of 1200, a Brookfield viscosity (125° C.) of 1,000 cps., an acid number of substantially 0 and a softening point of 108° C. containing 3%, by weight, of stearic acid is oxidized in a continuous oxidation system using air as the oxidizing agent at a temperature of 150° C. and 90 p.s.i. The emulsifiable polyethylene wax produced has practically the same properties as the nonemulsifiable wax except that its acid number is 13–15. The results of the thermal and emulsion stability tests are as follows:

| Polymer | Viscosity at 125° C. After Heating at 125° C. for— | | | | Emulsion at end of 3d day |
|---|---|---|---|---|---|
| | 0 days | 1 day | 2 days | 3 days | |
| Control | 1,320 | 6,800 | Set up | | Fail. |
| Acid treated | 1,260 | 1,600 | 1,910 | 2,300 | Good. |

As already indicated, amounts of aliphatic monocarboxylic acid of less than 1% can be employed in the practice of this invention. To illustrate, the procedure of this example is repeated using .8% stearic acid. The thermal and emulsion stability tests are as follows:

| | Viscosity at 125° C. after heating at 125° C. for— | | | |
|---|---|---|---|---|
| | 0 days | 1 day | 2 days | 3 days |
| Control | 1,080 | 6,400 | Set up | |
| 0.8% stearic acid | 940 | 2,320 | 5,000 | 6,600 |

*Example 7*

The nonemulsifiable polyethylene waxes which are prepared by polymerizing ethylene in the presence of a suitable coreactant can be employed in the process of this invention with good results. To illustrate, Example 1 is repeated using a polyethylene-isopropyl alcohol "telomer" wax having a molecular weight of 650. The thermal and emulsion stability tests are as follows:

| Polymer | Viscosity at 125° C. After Heating at 125° C. for— | | | | Emulsion at end of 3d day |
|---|---|---|---|---|---|
| | 0 days | 1 day | 2 days | 3 days | |
| Control | 400 | 420 | 560 | 850 | Border line pass. |
| Acid treated | 390 | 410 | 430 | 450 | Good. |

*Example 8*

The procedure of Example 7 is repeated using a polyethylene/isobutyl alcohol telomer wax having a molecular weight of 1000. The thermal and emulsion stability tests are as follows:

| Polymer | Viscosity at 125° C. After Heating at 125° C. for— | | | | Emulsion at end of 3d day |
|---|---|---|---|---|---|
| | 0 days | 1 day | 2 days | 3 days | |
| Control | 1,050 | 1,320 | 1,800 | 2,100 | Border line pass. |
| Acid treated | 1,050 | 1,160 | 1,350 | 1,560 | Good. |

*Example 9*

The nonemulsifiable polyethylene waxes prepared by direct synthesis from ethylene in the absence of a coreactant are useful in the preparation of the novel emulsifiable polyethylene waxes according to this invention. To illustrate, Example 1 is repeated using a polyethylene wax having a molecular weight of 3000, a Brookfield viscosity (125° C.) of 1,000 cps., and a softening point of 92° C. and 3%, by weight, of stearic acid. The thermal and emulsion stability tests are as follows:

| Polymer | Viscosity at 125° C. After Heating at 125° C. for— | | | | Emulsion at end of 3d day |
|---|---|---|---|---|---|
| | 0 days | 1 day | 2 days | 3 days | |
| Control | 2,075 | 3,100 | 3,800 | 4,000 | Fail. |
| Acid treated | 1,960 | 2,400 | 2,800 | 3,000 | Pass. |

Thus, this invention provides the art with a simple, direct and economically feasible process for the stabilization of emulsifiable polyethylene waxes against changes in viscosity and emulsifiability. In addition, there is provided a process for the preparation of novel emulsifiable polyethylene waxes exhibiting decreased "grit" formation without adversely affecting the other valuable properties of the emulsifiable wax. There is also provided an emulsifiable polyethylene wax which exhibits improved stability and which can be used as a substitute for any of the conventional emulsifiable polyethylene waxes in applications where this increased stability is of particular significance. The emulsifiable polyethylene waxes form excellent substitutes for carnauba wax, for example, but are superior thereto in that they are substantially tougher and more flexible. These novel waxes will disperse to form emulsifiable self-polishing waxes and take an extremely high polish.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. The method which comprises oxidizing a nonemulsifiable polyethylene wax with an oxygen-containing gas at a temperature in the range of about 100° to about 160° C. and a pressure up to 1,000 p.s.i.g., in the presence of an aliphatic monocarboxylic acid containing 2–20 carbon atoms, until the acid number of the wax is in the range of about 4 to about 25.

2. The method which comprises oxidizing a nonemulsifiable polyethylene wax with an oxygen-containing gas at a temperature in the range of about 130° to about 160° C. and a pressure up to about 1,000 p.s.i.g., in the presence of about .1 to about 10%, by weight, of an aliphatic monocarboxylic acid containing 2–20 carbon atoms, until the acid number of the wax is in the range of about 4 to about 25.

3. The method which comprises oxidizing a nonemulsifiable polyethylene wax having a molecular weight in the range of about 250 to 6,000 and a softening point in the range of about 88° to about 125° C., with an oxygen-containing gas at a temperature in the range of about 130° to about 160° C. and a pressure up to 1,000 p.s.i.g., in the presence of about .1 to about 10%, by weight, of an aliphatic monocarboxylic acid containing 2–20 carbon atoms, until the acid number of the wax is in the range of about 4 to about 25.

4. The method of claim 3 in which the aliphatic monocarboxylic acid contains 2–8 carbon atoms.

5. The method of claim 3 in which the aliphatic monocarboxylic acid contains 12–18 carbon atoms.

6. The method which comprises oxidizing a nonemulsifiable polyethylene wax having a molecular weight in the range of about 250 to about 6,000 and a softening point in the range of about 88° to about 125° C., with oxygen at a temperature in the range of about 130° to about 160° C. and a pressure up to 1,000 p.s.i.g., in the presence of about 3 to about 6%, by weight, of an aliphatic monocarboxylic acid containing 12–18 carbon atoms, until the acid number of the wax is in the range of about 8 to about 16.

7. The method which comprises oxidizing a nonemulsifiable polyethylene wax having a molecular weight in the range of about 250 to about 6,000 and a softening point in the range of about 88° to about 125° C., with air at a temperature in the range of about 130° to about 160° C. and a pressure up to 1,000 p.s.i.g., in the presence of about 3 to about 6%, by weight, of an aliphatic monocarboxylic acid containing 12–18 carbon atoms, until the acid number of the wax is in the range of about 8 to about 16.

8. The method which comprises oxidizing a nonemulsifiable polyethylene wax having a molecular weight in the range of about 250 to about 6,000 and a softening point of about 88° to about 125° C. with oxygen at a temperature in the range of about 130° to about 160° C. and a pressure up to about 1,000 p.s.i.g., in the presence of about .1 to about 10%, by weight, of an aliphatic monocarboxylic acid having the formula:

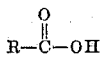

wherein R is an alkyl radical containing 2–19 carbon atoms until the acid number of the wax is in the range of about 8 to about 16.

9. The method of claim 3 in which the aliphatic monocarboxylic acid is stearic acid.

10. The method which comprises oxidizing nonemulsifiable polyethylene wax having a molecular weight of about 1,000 and a softening point of about 108° C. with oxygen at a temperature of about 150° C., in the presence of about 6%, by weight, of stearic acid, until the acid number of the wax is in the range of about 13 to about 15.

11. The method which comprises oxidizing a nonemulsifiable polyethylene wax having a molecular weight of about 1,000 and a softening point of about 108° C. with oxygen at a temperature of about 150° C. in the presence of about 3%, by weight, of acetic acid, until the acid number of the wax is in the range of about 13 to about 15.

12. The method which comprises oxidizing a nonemulsifiable polyethylene wax having a molecular weight of about 1,000 and a softening point of about 108° C. with oxygen at a temperature of about 150° C. in the presence of about 1%, by weight, of isobutyric acid, until the acid number of the wax is in the range of about 13 to about 15.

13. The method which comprises oxidizing a nonemulsifiable polyethylene wax having a molecular weight of 1200 and a softening point of about 108° C. with air at a temperature of about 150° C. and a pressure of 90 p.s.i., in the presence of .8%, by weight, of stearic acid, until the acid number of the wax is in the range of about 13 to about 15.

References Cited by the Examiner

UNITED STATES PATENTS 2,766,214 10/56 Erchak et al.
3,060,163 10/62 Erchak _____ 260—94.9

JOSEPH L. SCHOFER, *Primary Examiner.*

LEON ZITVER, *Examiner.*